United States Patent [19]
Fraval et al.

[11] 4,405,024
[45] Sep. 20, 1983

[54] WEIGHING DEVICES

[75] Inventors: Robert H. Fraval, Langley; Howerd P. Oakford, Byfleet, both of England

[73] Assignee: National Research Development Corporation, London, England

[21] Appl. No.: 293,631

[22] PCT Filed: Dec. 8, 1980

[86] PCT No.: PCT/GB80/00212
§ 371 Date: Aug. 7, 1981
§ 102(e) Date: Aug. 7, 1981

[87] PCT Pub. No.: WO81/01742
PCT Pub. Date: Jun. 25, 1981

[30] Foreign Application Priority Data
Dec. 8, 1979 [GB] United Kingdom ............... 7942430

[51] Int. Cl.³ .................... G01G 19/00; G01G 3/14
[52] U.S. Cl. ................................ 177/200; 177/1; 177/210 FP
[58] Field of Search ................... 177/210 FP, 200.1

[56] References Cited
U.S. PATENT DOCUMENTS

| 3,322,222 | 5/1967 | Baur | 177/210 FP |
| 3,555,886 | 1/1971 | Thornton | 177/210 FP X |
| 4,158,395 | 6/1970 | Brown. | |

FOREIGN PATENT DOCUMENTS

| 1774739 | 2/1972 | Fed. Rep. of Germany. |
| 459603 | 9/1968 | Switzerland. |
| 520326 | 4/1972 | Switzerland. |
| 1106907 | 3/1968 | United Kingdom. |
| 2064770 | 6/1981 | United Kingdom ......... 177/210 FP |

*Primary Examiner*—George H. Miller, Jr.
*Attorney, Agent, or Firm*—Young & Thompson

[57] ABSTRACT

A weighing device uses frequency measurement to determine weight. One body (3; 23; 68) is of known mass and another body (8; 28; 66) also of known mass is spring (9; 29; 83) connected to it. This body carries the load whose mass is to be determined. Both bodies can oscillate in one mode in an effectively isolated system, being carried by springs (2, 13; 22, 33; 65, 67) from a support (1; 21; 60, 62). The oscillations are electromagnetically generated, but when a certain amplitude is attained the drive is cut off and the system resonates freely. The frequency varies with the mass of the bodies, and so a load on one can be weighed by reference to the frequency, which can be detected through the electromagnetic means (12, 32, 76) which provided the initial drive pulses.

10 Claims, 7 Drawing Figures

WEIGHING DEVICES

This invention relates to weighing devices. It is intended primarily for use in a moisture meter where it is important to have an accurately weighed sample. The proposed device allows this to be done in a receptacle that can form part of the meter itself.

It is also desirable to have a weighing device that is not dependent on counterbalancing weights or one where its orientation is important, as in most scales.

According to one aspect of the present invention there is provided a device for weighing a load of unknown mass comprising a first body of known mass, a second body of known mass adapted to carry a load of unknown mass, said bodies being supported so that for one mode of movement they are substantially unimpeded at least over a limited distance, spring means of known rate connecting said bodies so that their natural oscillations are in said one mode, and means for determining the resonant frequency of such oscillations and hence the mass of said load.

According to another aspect of the present invention there is provided a method of weighing a load of unknown mass comprising:

(i) supporting first and second bodies of known mass in such manner that for one mode of movement they are substantially unimpeded at least over a limited distance, (ii) spring connecting said bodies so that the natural oscillations of the two bodies are in said one mode, (iii) determining the resonant frequencies of said oscillations over a range of ladings of said second body, (iv) lading said second body with a load of unknown mass, (v) causing the body/spring assembly to oscillate in said one mode, and (vi) determining from the resonant frequency of natural oscillations the mass of said load.

By natural oscillations is meant the usual movement of a spring mounted body, making most use of the spring characteristics. For example, with a coil spring this movement is longitudinal of the coil, although oscillations are possible transversely of this direction, by means of the spring flexing.

Conveniently, the vibrations will be initally generated by electro-magnetic means, such as a coil mounted on either body and co-operating with magnetised poles on the other body of the assembly. Pulses applied to this coil at a frequency approximating to the expected resonant frequency generate the oscillations, and when the pulses are stopped substantially free harmonic motion exists. The coil can be used in detecting the amplitude during intervals between pulses, and when a given amplitude is achieved the pulses may be stopped. This is advisable since frequency is affected by amplitude. Alternatively, the pulses may be stopped after a predetermined number. The coil can subsequently be used to detect the natural frequency of oscillation, which is a direct measure of the mass of the sample since the other masses and the values of the spring constants are known. A spring constant is a function of temperature, and a corrective factor can be introduced to allow for this, for example in the electronic processing of the detected oscillations, or use could be made of spring material with a very low temperature constant.

Preferably, the first body and the second body when laden are in the same mass range, and each body is supported solely by matching spring means from a base member. The bodies move in opposite directions and the components of forces in the springs in the direction of oscillation cancel out, thus isolating the oscillating system from the base member.

For a better understanding of the invention some examples will now be described, by way of example, with reference to the accompanying drawings, in which.

Figure 1:
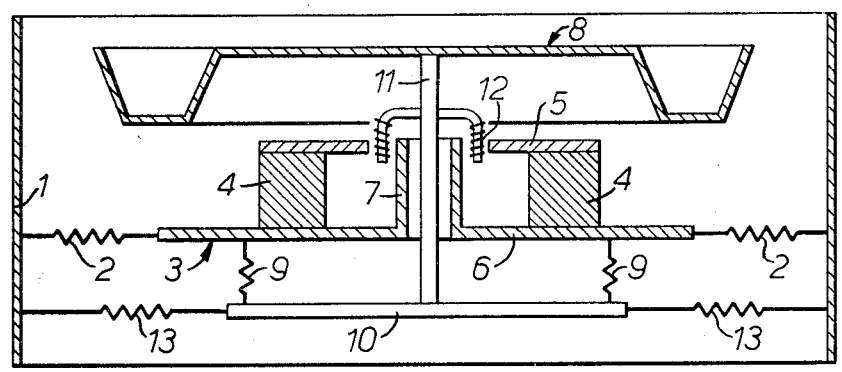
FIG. 1 is a diagrammatic sectional elevation of a weighing device.

The device of FIG. 1 has a fixed outer casing 1 within which is suspended, by springs 2 attached to the wall of the casing, a structure 3 of known mass. The springs 2 are illustrative only of any means which can decouple the structure 3 from the casing 1 and its environment. In order to achieve accuracy, the structure 3 should not be in firm contact with its support, since the latter could then affect the resonant frequency of the system to be described.

The structure 3 has permanent magnets 4 (or a complete ring magnet) with annular pole pieces 5 and 6, the pole piece 6 being a disc of magnetically permeable material with a central spigot 7 which forms an annular gap with the inner periphery of the pole piece 5. A receptacle 8 for a sample to be weighed is coupled to the structure 3 by springs 9. These suspend a circular plate 10 from whose centre a column 11 extends upwardly through the spigot 7 to carry the receptacle 8. A coil 12 is also carried by this column 11 and is located in the gap between the pole piece 5 and spigot 7. There is a further spring connection between the plate 10 and the casing 1, these springs 13 matching the springs 2.

The sample to be weighed is put into an annular trough 14 around the periphery of receptacle 8, and when levelled off, completely filling the trough, the assembly 8, 10, 11, 12 will be in the same mass range as the structure 3. The sample distribution will keep the receptacle balanced with the column 11 upright, and since the filled trough represents a known volume, once the weight is determined the density can readily be calculated. The receptacle assembly 8, 10, 11, 12 is of known mass and the springs 9 are of known rate so that from the resonant frequency of vertical oscillations the mass of any charge in the receptacle can be calculated.

For a weighing operation the receptacle is charged and pulses are fed to the coil 12. This generates vertical oscillatory motion of both the receptacle 8 and the structure 3, the amplitudes of oscillation being equal when the masses of the magnet structure and the receptacle assembly are the same. When this motion has stabilized or reached a given amplitude, the pulses are cut off, and the system achieves free harmonic motion. The springs 2 and 13 isolate the resonant system from the casing, their vertical components of forces effectively cancelling out since their respective moving structures, which are in the same mass range, are always travelling in opposite directions with matching motions. The resultant frequency can be determined from signals induced in the coil 12. It depends mainly on the rate of springs 9 and the relative mass of the structure 3 and the filled receptacle 8, but also to some extent on the amplitude of the oscillations. For consistency and accuracy it is therefore desirable to take the frequency measurement at a defined amplitude, which can be determined by mechanical, electrical, electromechanical or optical methods. A particular one will be described later.

Different weights in the receptacle give different frequencies, and this relationship can be pre-calculated and/or determined by tests, and then calibrated for immediate read-out. The free motion frequency achieved is most conveniently detected by using the coil 12 which is moving within a magnetic field. Circuitry for achieving this will be described below.

As mentioned above, temperature affects the springs, and this can be allowed for electronically or by suitable selection of spring material.

Figure 2:
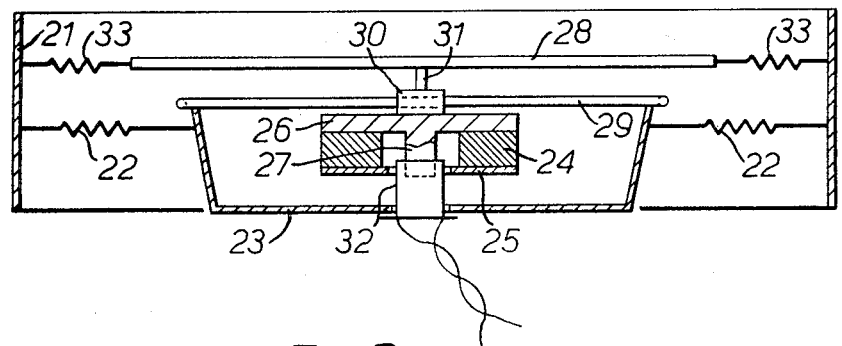
FIG. 2 is a diagrammatic sectional elevation of a modified weighing device.

A somewhat different device, but embodying the same principles, is shown in FIG. 2. A casing 21 suspends by means of springs 22 a structure 23. Within this is housed a magnet assembly comprising an annular magnet 24 and pole pieces 25 and 26, the latter being a disc with a downwardly projecting central stem 27 forming an annular gap with the inner periphery of a washer-like pole piece 25. A platform 28 is supported above the structure 23 by means of an S-shaped spring 29 spanning the structure and passing through a boss 30 centrally secured to the upper side of the pole piece 26. The connection between platform 28 and boss 30 is by a short column 31. A coil 32 mounted centrally of the base of the structure 23 projects upwardly into the gap between pole piece 25 and stem 27. Springs 33 couple the platform 28 to the casing 21, the springs 22 and 33 being equivalent to the springs 2 and 13 of FIG. 1.

In FIG. 1 the coil is part of the variable mass, while in FIG. 2 it is part of the known mass. The receptacle in FIG. 2 is shown as a flat platform, and for many weighing purposes this is quite adequate. It will be understood that hollow receptacles could be used instead. In both examples, instead of a coil/magnet system, the oscillatory drive could be generated by an electro-magnet/magnet system.

Figure 3:
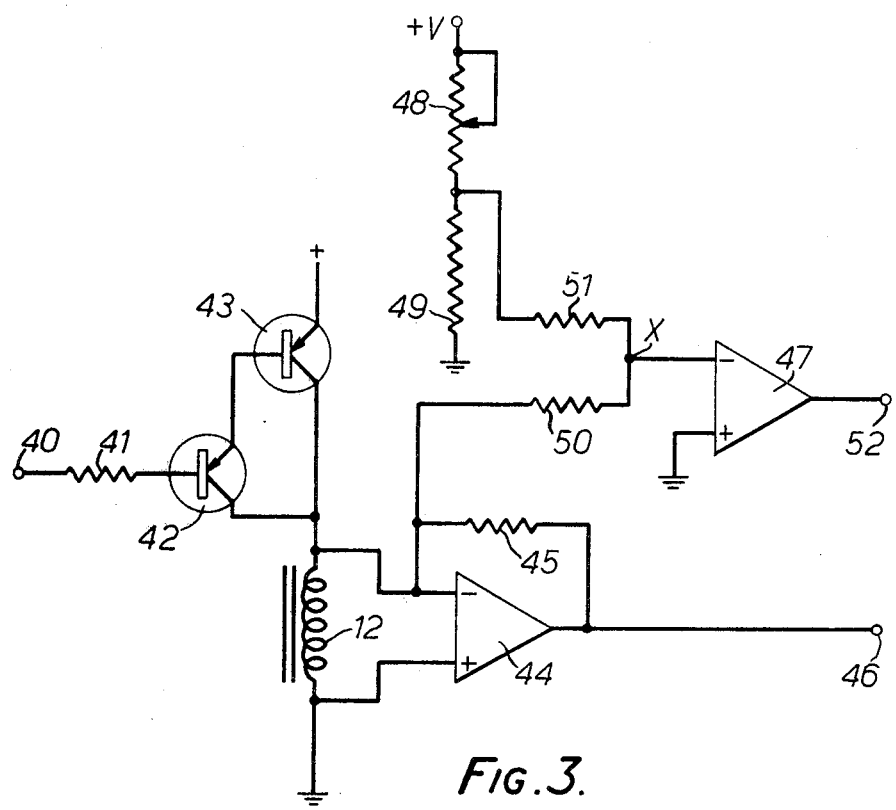
FIG. 3 is a diagram of a control and read-out circuit associated with such weighing devices.

FIG. 3 shows a circuit for interfacing either of the weighing devices described with a microprocessor (not shown), for driving the initial oscillations and for obtaining usable pulses from the coil, here referenced 12 as in FIG. 1.

The microprocessor will provide negative going pulses at approximately the expected natural resonant frequency at input terminal 40. These pass through resistor 41 to a Darlington pair of PNP transistors 42, 43 which are in circuit across the supply voltage with the coil 12. With terminal 40 high (the off state) the transistors 42, 43 are switched off, but each pulse turns them on, generating a positive going pulse on the coil 12, and hence movement of the weighing device.

The coil 12 is connected to a first operational amplifier 44, which forms a high gain squaring circuit, converting the low amplitude sine wave signal from the coil into a square wave of the same period. Feedback resistor 45 limits the gain and increases the slew rate. The output of the amplifier passes to a monostable (not shown as it has no material effect on the operation of the circuit) and thence to a terminal 46 at an input of the microprocessor.

The coil 12 is also connected to a second operational amplifier 47, the coil output being summed at point X with that of a small reference voltage from a divider chain. This is formed by potentiometer 48 and resistor 49, and the outputs are applied through respective resistors 50, 51 to the negative input of the amplifier. The positive input is grounded. The voltage V applied to the divider chain is stabilised and the resistance values are R48 and R49.

When the voltage from coil 12 falls below $$\frac{-V \cdot R48}{R48 + R49}$$

point X goes below ground potential and so the output of amplifier 47 goes high. This happens when the oscillations of the weighing device have reached a given amplitude the level of which is set by potentiometer 48. This amplifier output is to a terminal 52 at another input of the microprocessor. Of course, when input 40 is low, the coil voltage is high and blocks any high output from amplifier 47.

Figure 4:
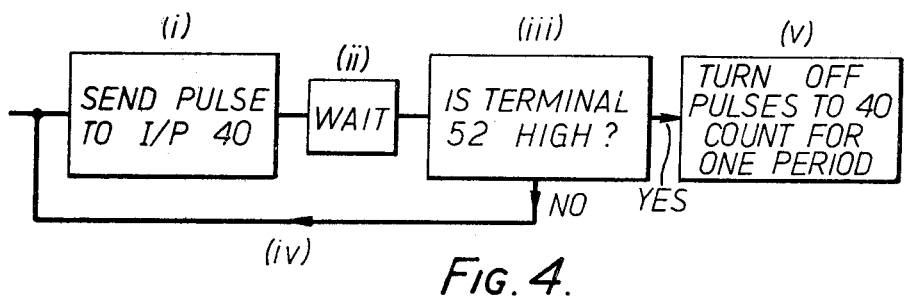
FIG. 4 is a block diagram illustrating a microprocessor program.

This circuit operates in conjunction with the weighing device and the microprocessor (MCP) program, which performs several functions in sequence as follows, and as illustrated diagrammatically in FIG. 4.

(i) The MCP sends an active low pulse of length equal to approximately one third of the unloaded weighing device resonant period to input 40. An oscillation is started in a "forward" direction by the coil 12. A corresponding pulse appears at terminal 46, but there cannot yet be a high output at 52 as coil 12 goes positive.

(ii) The MCP then waits for a period equal to half the length of its pulse, i.e. to just before the mid-point of the cycle of oscillation when the maximum output from the return movement of the coil occurs. When the device is loaded, the oscillations will be slower and so after a time equal to ($\frac{2}{3} \times 1/6$) of the unloaded period the loaded device will still have to generate its peak output on the return movement.

(iii) By this time terminal 52 could be high if the oscillation is sufficient to induce a negative voltage in coil 12 which outweighs the reference voltage. The MCP now checks for this high over a brief length of time, approximately $\frac{1}{8}$th of the unloaded resonant period, which will be sufficient even when the device is loaded since the periods will not vary to a large extent.

(iv) Whatever the amplitude reached, there will still be a pulse at terminal 46, induced by the return movement of the coil. If the required amplitude is not reached, the return to high of terminal 46 causes the MCP to return to stage (i).

(v) If the required amplitude is reached, the MCP, triggered from terminal 52, disables the drive pulse output to terminal 40 and counts up at a fixed rate for one or more periods of the weighing device as the device resonates freely, using the pulses at 46. Generally several periods will be counted and averaged, for greater resolution. Decay of amplitude, and hence a change in period, is negligible over say four periods.

The counting is carried out by the MCP which, to keep the count in the correct phase, is programmed
 (a) to loop while output 46 is low
 (b) to loop whilst counting while 46 is high
 (c) to loop whilst counting while 46 is low.

The instruction to count will occur when terminal 46 is low, during the induced pulse which sends terminal 52 high. However, this is an indeterminate point, and so the count should not commence immediately. Instead, the MCP waits until 46 goes high, counts during that phase and during the subsequent low phase and so a complete half period is ascertained. Preferably (b) and (c) are repeated to a total of eight times each so that four periods are counted.

Although the devices described have vertical oscillations, it should be understood that this is not essential and versions with horizontal or even inclined movement would be equally workable. Also it is not essential that the devices be held exactly in their intended attitude: they are tolerant of being held and operated in the hand.

Figure 5:
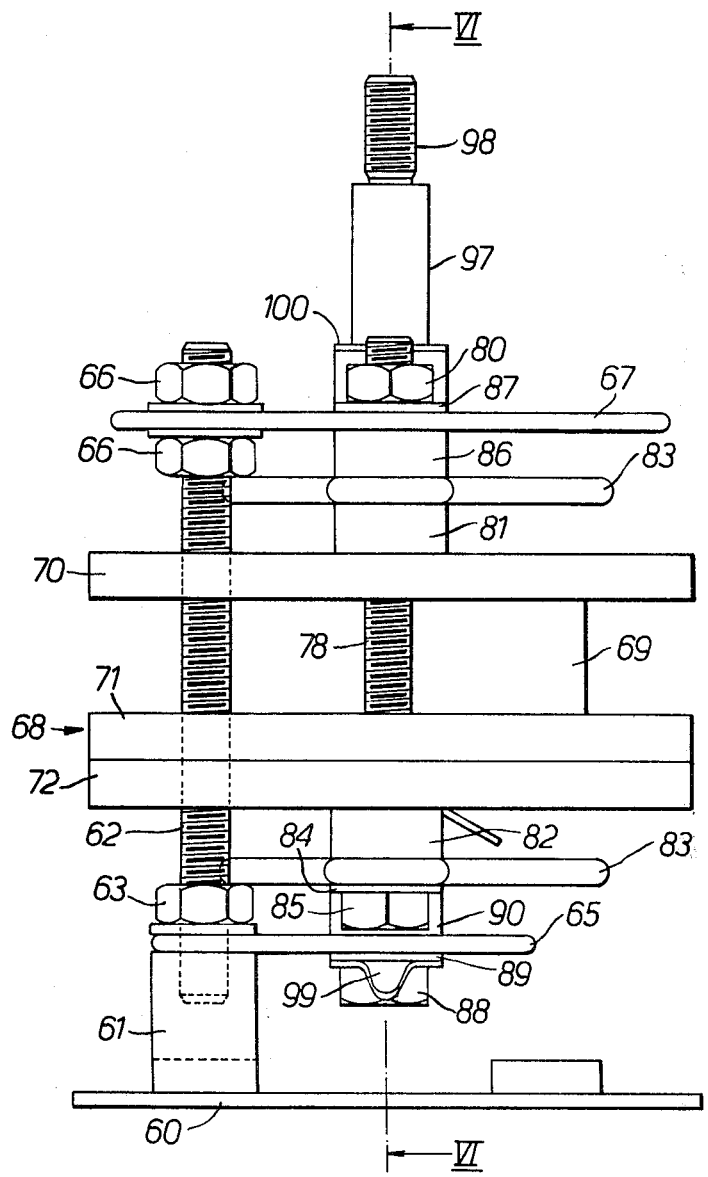
FIG. 5 is a side view of a practical example of a weighing device.
Figure 6:
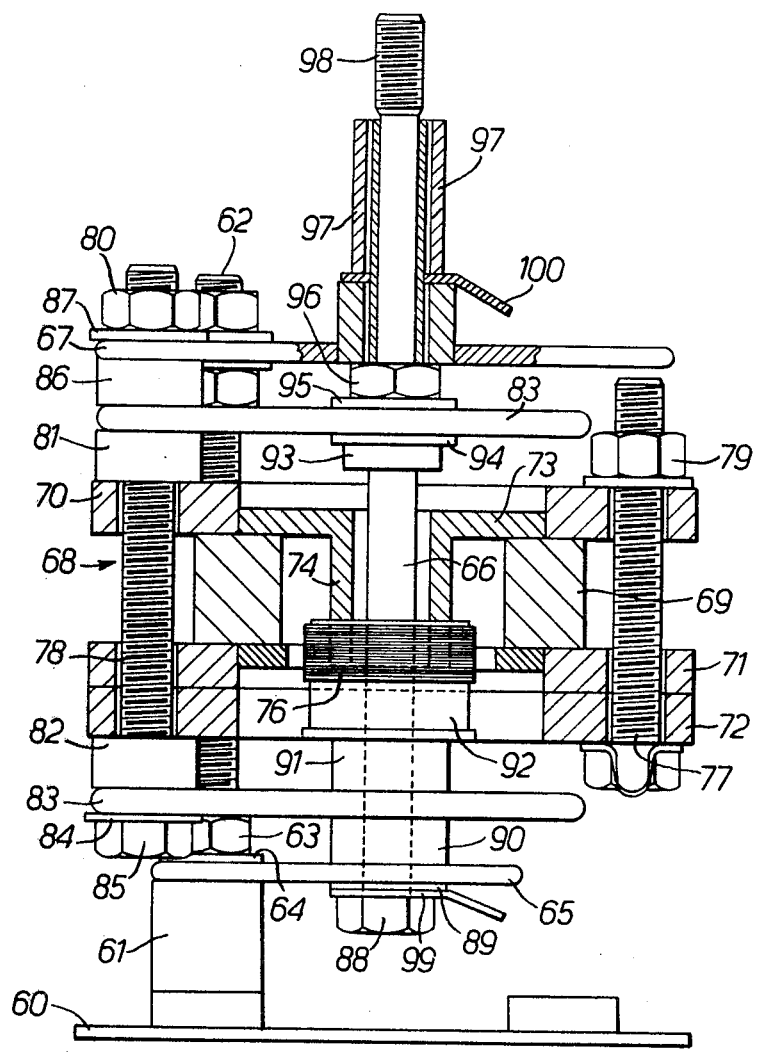
FIG. 6 is a section on the line VI—VI of FIG. 5.
Figure 7:
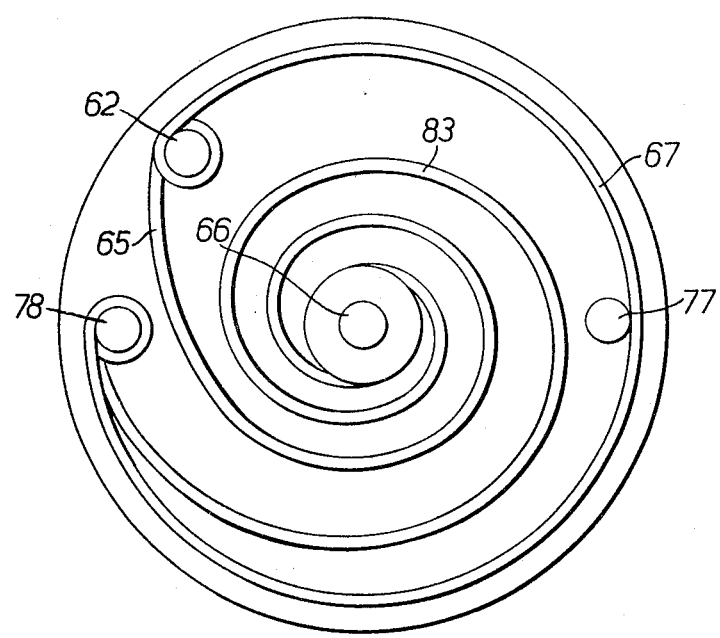
FIG. 7 is a diagrammatic plan view showing the spring arrangements of the device.

A practical example is shown in FIGS. 5, 6 and 7. This has a base plate 60 with a boss 61 at one side into which is screwed a vertical column 62. A nut 63 and washer 64 trap one end of a spiral spring 65 against the head of the boss 61, the other end of this spring (equivalent to 13 in FIG. 1) being connected to a central spindle 66. At the top of the column 62 a double nut and washer assembly 66 trap the end of another spring 67, (equivalent to 2 in FIG. 1) which is connected to a magnet assembly 68. This spring is an almost complete circular loop.

The magnet assembly comprises a magnet 69 held between upper and lower rings 70 and 71, the lower ring being backed by an auxiliary ring 72. The column 62 passes freely through apertures near the edges of these rings. The magnet has an upper pole piece 73 with a cylindrical spigot 74 freely surrounding the spindle 66 and projecting downwardly to be radially spaced from a lower pole piece 75. A coil 76 mounted on the spindle 66 is disposed in the annular gap between the pole pieces.

The magnet assembly is clamped together in the axial direction by diametrically opposite bolts 77 and 78 secured by nuts 79 and 80. The bolt 77 just serves as a clamp, but bolt 78 is longer and is additionally used for connection to various springs. Respectively above and below the rings 70 and 72 there are spacers 81 and 82 for locating the ends of spiral springs 83 (equivalent to 9 in FIG. 1) coupling the magnet assembly to the central spindle 66. The lower spring 83 is clamped between a washer 84 adjacent the head 85 of the bolt 78 and the lower spacer 82, the upper spring 83 is clamped between the spacer 81 and a further spacer 86, and the spring 67 is clamped between this spacer 86 and a washer 87 below the nut 80.

At its lower end, the spindle 66 has a head provided by a nut 88, and the other end of spring 65 is clamped between a washer 89 on this nut and a spacer 90. The other end of lower spring 83 is clamped between this spacer 90 and another spacer 91. A mounting 92 for the coil 76 is above this. Further up the spindle there is a collar 93, and on this bears in ascending order a washer 94, the other end of upper spring 83 and a further washer 95, these being clamped by a nut 96. Above this, the spindle is surrounded by a sleeve assembly 97 and its exposed upper end 98 is threaded for mounting a receptacle (not shown).

Between the nut 88 and the washer 89 there is a further washer 99 with a solder tag, and a similar element 100 forms part of the sleeve assembly 97. External electrical connections are made here, and there are internal connections (not shown) via the spindle to the coil, the elements 99 and 100 being mutually insulated.

The spiral springs 83 are identical, and form a parallel linkage which ensures that the spindle assembly and magnet assembly, which they interconnect, move in parallel. The other springs 65 and 67 although perforce of different shape, have substantially the same rate and other characteristics at least for oscillations in the axial direction of the spindle.

The auxiliary ring 72 is replaceable by other rings of smaller or greater mass, or removable altogether, in order that the magnet assembly 68 should be in the same mass range as the loaded spindle assembly. It will not need changing for every weighing operation, and indeed will be virtually permanent in many cases. The sample loads will generally be known to be within a certain range, say 0–300 grams, and so the magnet assembly can be ballasted to make it match a median load of 150 grams, for example.

We claim:

1. A device for weighing a load of unknown mass comprising a first body (3; 23; 68) of known mass, a second body (8; 28; 66) of known mass adapted to carry a load of unknown mass, a base (1; 21; 60, 62), a suspension system in the form of matching spring means (2, 13; 22, 33; 65, 67) for each body supporting the bodies on the base for substantially unimpeded motion in one mode over at least a limited distance, and further spring means (9; 29; 83) connecting said bodies so that their natural oscillations are in said one mode and mutually opposed, whereby opposite forces are transmitted via the spring suspension means to the base and the bodies are substantially isolated from the environment, and means (12; 32; 76) for determining the resonant frequency of such oscillations and hence the mass of the load.

2. A device as claimed in claim 1, wherein pulse-operated electromagnetic means (7, 12; 27, 32; 74, 76) are provided for generating oscillations at a frequency approximating to the expected resonant frequency, there being means (47) for blocking the pulses prior to the determination of the resonant frequency.

3. A device as claimed in claim 2, wherein the electromagnetic means are arranged to produce, after the pulses are blocked, signals corresponding to the subsequent natural oscillations.

4. A device as claimed in claim 1, 2 or 3, wherein means (48, 49) are provided for determining a given amplitude of oscillations and, when this is achieved, for activating the means for determining the resonant frequency.

5. A device as claimed in claim 4, wherein pulse-operated electromagnetic means (7, 12; 27, 32; 74, 76) are provided for generating oscillations at a frequency, and are arranged to produce, during a fraction of the pulse cycle when a pulse is not present, an indication of the amplitude of oscillation.

6. A method of weighing a load of unknown mass comprising:
   (i) supporting first and second bodies by respective matching spring means from a base in such manner that for one mode of movement they are substantially unimpeded at least over a limited distance,
   (ii) spring connecting said bodies so that the natural oscillations of said bodies are opposed and in said one mode, whereby opposite forces are transmitted by the spring supporting means to the base and the bodies are substantially isolated from the environment, (iii) determining the resonant frequencies of said oscillations over a range of ladings of said second body, (iv) lading said second body with a load of unknown mass, (v) causing the body/spring assembly to oscillate in said one mode, and (vi) determining from the resonant frequency of natural oscillations the mass of said load.

7. A method as claimed in claim 6, wherein the oscillations are generated electromagnetically by pulses at a frequency approximating to the expected resonant frequency, these pulses being blocked prior to said determination.

8. A method as claimed in claim 7, wherein the pulses are applied to electromagnetic means which also serve, after the pulses are blocked, to produce signals corresponding to the subsequent natural oscillations.

9. A method as claimed in claim 6, 7 or 8, wherein said determination from the resonant frequency is carried out a given amplitude of oscillation.

10. A method as claimed in claim 9, wherein initially oscillations are generated electromagnetically by pulses at a frequency approximating to the expected resonant frequency, and during the fraction of the pulse cycle that a pulse is not present the electromagnetic means serve to provide an indication of the amplitude of oscillation.

* * * * *